United States Patent [19]

Neymeyer

[11] 4,425,216

[45] Jan. 10, 1984

[54] GAS GENERATION APPARATUS

[76] Inventor: Calvin E. Neymeyer, 1812 N. 7th St., Clinton, Iowa 52732

[21] Appl. No.: 264,729

[22] Filed: May 18, 1981

[51] Int. Cl.³ .................. C25B 9/00; C25B 11/03; C25B 15/08

[52] U.S. Cl. .................. 204/270; 204/273; 204/278; 204/284; 204/289

[58] Field of Search .................. 55/308, 444; 204/270, 204/275–278, 129, 269, 273, 284, 289

[56] References Cited

U.S. PATENT DOCUMENTS

| 525,304 | 8/1894 | Woods | 204/275 X |
|---|---|---|---|
| 823,650 | 6/1906 | Vareille | 204/270 |
| 922,134 | 5/1909 | Goucher | 204/275 X |
| 1,145,862 | 7/1915 | Goucher | 204/269 |
| 1,398,658 | 11/1921 | Vincent | 204/129 |
| 1,588,214 | 6/1926 | Walsh | 204/129 |
| 1,600,478 | 9/1926 | Lawaczeck | 204/270 |
| 2,876,862 | 3/1959 | Hummell | 55/444 |
| 3,216,911 | 11/1965 | Kronenberg | 204/278 X |
| 3,222,269 | 12/1965 | Stanton | 204/270 |
| 3,273,666 | 9/1966 | Hamilton et al. | 55/308 X |
| 3,379,634 | 4/1968 | Rutkowski | 204/129 X |
| 3,523,834 | 8/1970 | Hewins | 204/273 X |
| 3,650,935 | 3/1972 | Andersson | 204/275 X |
| 3,753,889 | 8/1973 | Eisner | 204/DIG. 10 |
| 3,767,542 | 10/1973 | Carlson | 204/129 X |
| 3,790,465 | 2/1974 | Giacopelli et al. | 204/270 X |
| 3,925,212 | 12/1975 | Tchernev | 250/527 |
| 3,930,151 | 12/1975 | Shibata et al. | 204/270 X |
| 3,957,618 | 5/1976 | Spirig | 204/270 |
| 3,972,792 | 8/1976 | Laxen | 204/275 X |
| 4,090,927 | 5/1978 | Fresnel et al. | 204/275 X |
| 4,113,601 | 9/1978 | Spirig | 204/230 |
| 4,139,429 | 2/1979 | Steward et al. | 204/237 X |
| 4,140,616 | 2/1979 | Wheatley et al. | 204/270 X |
| 4,181,591 | 1/1980 | King | 204/277 X |

Primary Examiner—Donald R. Valentine
Attorney, Agent, or Firm—Henderson & Sturm

[57] ABSTRACT

The invention relates to devices employed for generation of oxygen-hydrogen gas. Efficient production of gas is achieved by an electrode assembly (18) placed within a chamber assembly (17) the input end of which is elevated above the output end. Electrodes (38) having surfaces (41) with ribs (57) form narrowing, deepening channels (56) down which electrolyte flows in a turbulent manner.

10 Claims, 6 Drawing Figures

GAS GENERATION APPARATUS

TECHNICAL FIELD

This invention relates to apparatus for making fuels. More particularly, this invention relates to manufacture of hydrogen or oxygen-hydrogen gas, as by electrolysis of water, for use as a fuel or fuel additive.

BACKGROUND ART

A standard electrolytic cell generally includes a housing bearing an electrolyte, an anode and a cathode, the electrodes being immersed in the electrolyte. More complex structures have been devised for desalination of water and for production of various commercially useful products, such as sodium chlorate. A number of patents discuss an electrolytic apparatus for production of detonating gas.

It is now generally recognized that reliance upon fossil-fuels will have to be decreased in the future. Also recognized as a desirable goal is the reduction of pollution in the environment. Hydrogen has for its primary combustion product water. As its usage would facilitate the realization of the two aforementioned goals, investigation of the uses of hydrogen as a primary fuel or as a fuel-extending additive has been increasing. It is necessary, then, to supply hydrogen or oxygen-hydrogen gas in large quantities, but in an energy-efficient manner, for research, pilot projects, and commercial applications.

DISCLOSURE OF INVENTION

The gas generation apparatus includes a casing with a removable top. A chamber assembly is mounted inside the casing. Electrodes are mounted within the chamber.

The electrodes are disposed such that the side surfaces thereof define a plurality of narrowing channels. The electrodes have a smoothly varying vertical dimension such that the aforementioned channels become deeper as they narrow. Ribs are fixed to the electrodes and project into the channels.

The gas generation apparatus is placed at an angle to the horizontal such that the broader ends of the channels are elevated with respect to the narrower ends of the channels. Water flows through the channels in a turbulent fashion.

An object of this invention is provision of an apparatus for generation of oxygen-hydrogen gas in large quantities in a more efficient manner.

Another object of this invention is provision of an apparatus which may use salt water as an electrolyte and may use wasted heat energy or solar energy to facilitate generation of oxygen-hydrogen gas.

Also an object of this invention is provision of apparatus wherein flow of the electrolyte is more turbulent, thereby facilitating oxygen-hydrogen gas generation.

These objects and other features and advantages of this invention will become readily apparent upon referring to the following description and drawings.

BRIEF DESCRIPTION OF DRAWINGS

This invention of a gas generation apparatus is illustrated in the drawings wherein.

BEST MODE FOR CARRYING OUT THE INVENTION

Figure 1:
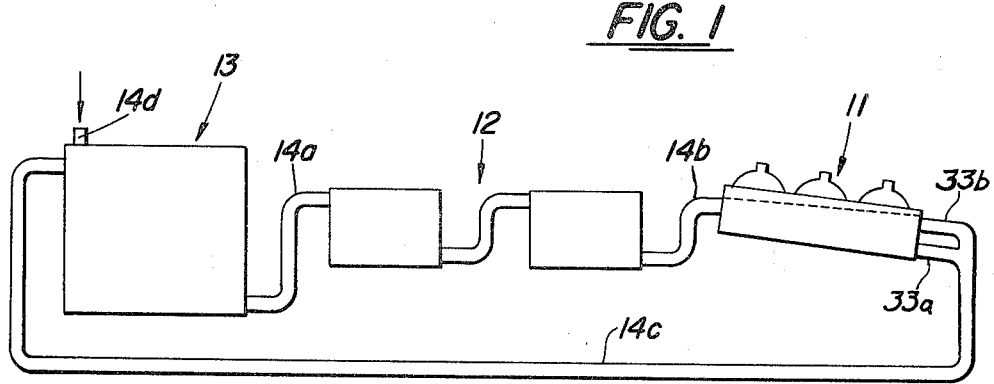
FIG. 1 is a schematic diagram of the apparatus employed in conjunction with other equipment.
Figure 2:
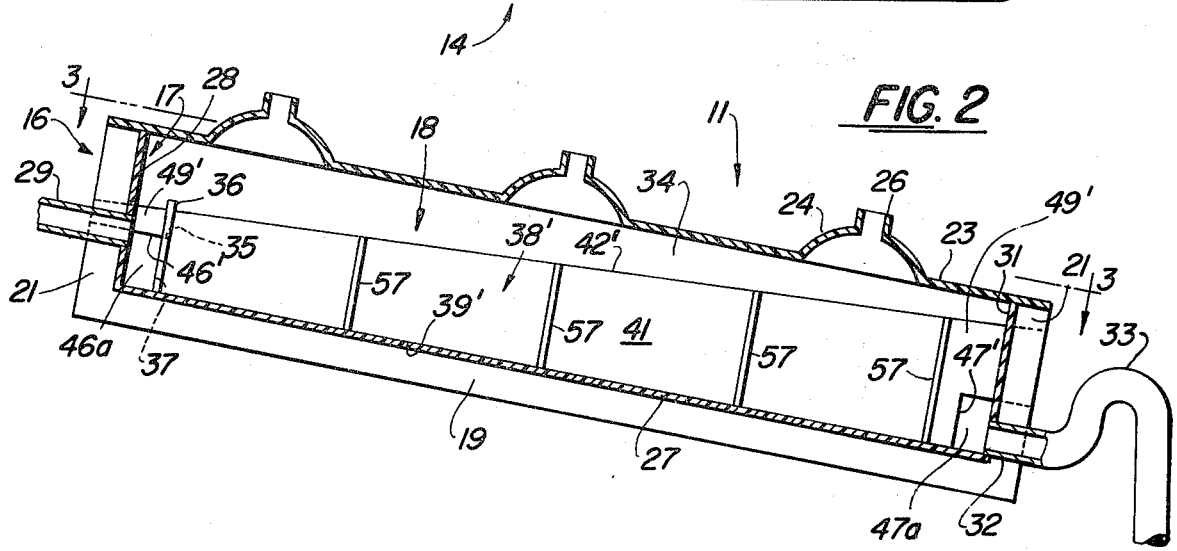
FIG. 2 is an enlarged, fragmentary, vertical longitudinal cross sectional view taken along line 2—2 in FIG. 3.

The gas generation apparatus of this invention is illustrated generally at 11 in FIGS. 1 and 2. The apparatus 11 is joined to one or more heat sources 12 and to a storage unit 13 (preferably insulated) by connecting pipes 14. Make-up electrolyte, such as salt water, enters storage 13 through inlet 14d. Electrolyte passes at 14a from storage 13 to the heat source(s) 12 and at 14b to the apparatus 11. Electrolyte drained is returned at 14c to storage 13 driven by a pump (not shown). The apparatus 11 more particularly includes a casing assembly 16, a chamber assembly 17 and an electrode assembly 18.

The casing assembly 16 (FIGS. 2 and 3) includes a rectangular bottom wall 19. Generally rectangular end walls 21 and side walls 22 extend upwardly from the periphery of the bottom 19. Components of the casing 16 generally are formed from non-conducting, insulating materials.

The chamber assembly 17 (FIGS. 2 and 3) includes a removable top 23 spanning the opening formed by walls 21, 22. Formed in the top 23 are a plurality of dome or hemispherical areas 24 which extend away from bottom 19. Placed centrally in each area 24 is a vent 26 leading to a storage unit or other structure (not shown) for receiving and/or operating upon oxygen-hydrogen gas.

The chamber assembly 17 also includes a rectangular bottom wall 27. An inlet end wall 28 is fixed normal to one end of bottom 27, and has an inlet 29 joined thereto which extends through wall 21 to receive pipe 14b. An outlet end wall 31 is fixed normal to the opposite end of bottom 27. An outlet 32 extends from wall 31, through wall 21, to a trap 33, and return pipe 14c is connected to the trap 33. Side walls 34 are fixed to bottom 27 and extend between ends 28, 31.

An alternate, cold weather construction, is shown in FIG. 1. A lower, arcuate pipe section 33a extends out and down from outlet 32 to return pipe 14c. An upper, arcuate pipe section 33b extends from an upper outlet 32a formed through walls 31, 21. The section 33b extends out and down, into return 14c above section 33a. The upper section 33b operates as an overflow drain, and the bottom section 33a allows all electrolyte to empty from chamber 17, thereby reducing any possibility of damage thereto from freezing of the electrolyte.

The chamber 17 fits within casing 16, the respective bottoms 19, 27, ends 21, 28, 31 and sides 22, 34 abutting. The components of the chamber 17 generally are formed from insulating, non-conducting, heat-resistant materials such as ceramics and also plastics which can withstand temperatures to which the electrolyte may be heated.

The electrode assembly 18 includes a transverse baffle 36 (FIGS. 2 and 3), formed from a non-conducting material, disposed within chamber 17, upon bottom 27, adjacent and parallel to inlet end wall 28. Pluralities of notches 35, 37 are formed into upper and lower edges respectively of baffle 36.

Figure 4:
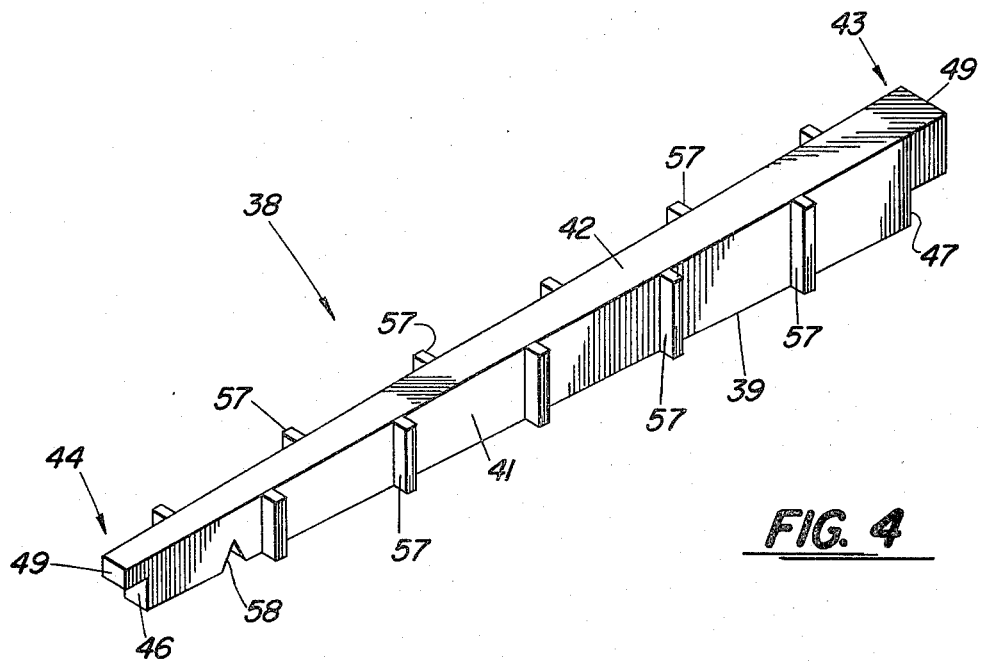
FIG. 4 is an enlarged, perspective view of an electrode from the gas generation apparatus.

The electrode assembly 18 also includes a plurality of platinum-coated electrodes 38 (see also FIG. 4). Each electrode 38 has a bottom surface 39 which is disposed flat against the bottom 27.

Figure 3:
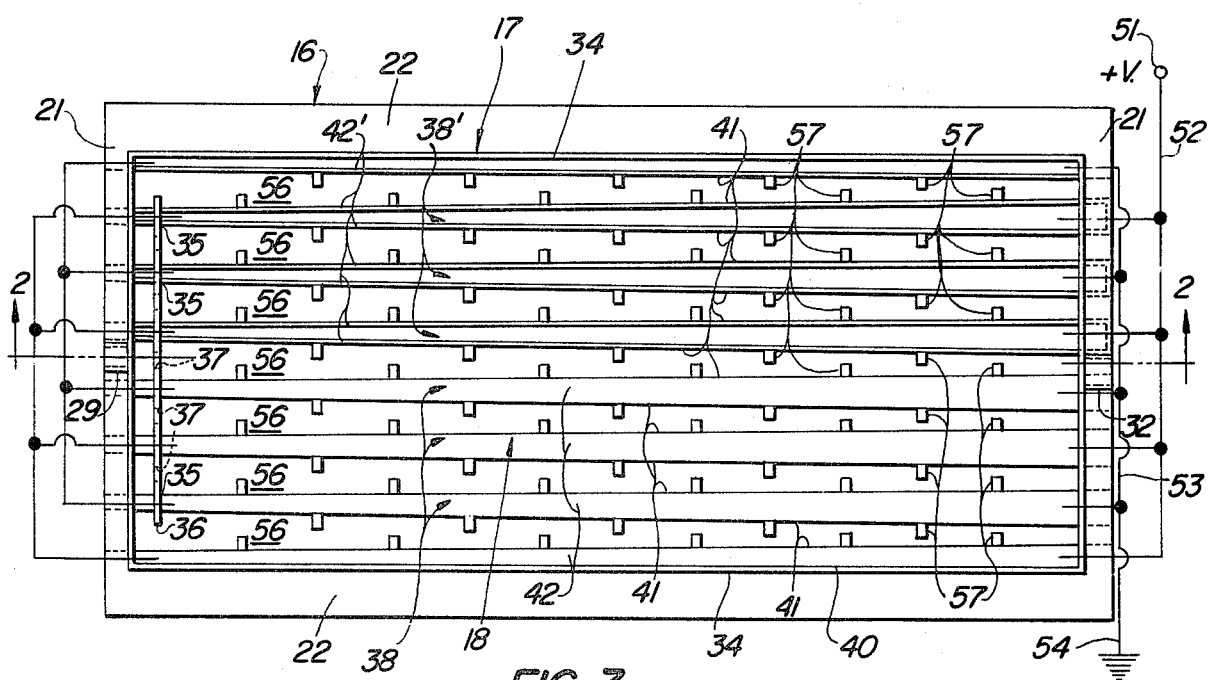
FIG. 3 is an enlarged, fragmentary, horizontal sectional view taken along line 3—3 in FIG. 2.

The two outer electrodes 38 have side surfaces 40 normal to surfaces 39 and parallel to the longitudinal axes of the electrodes 38, which surfaces 40 are disposed against the sides 34 (FIG. 3). Each electrode 38 has at least one channel-forming side surface 41 which is oriented normal to surface 39 but at an angle to the electrode 38 longitudinal axis. The side surfaces 40, 41 smoothly diverge such that the electrodes 38 taper from wide ends 43 to narrow ends 44. The side surfaces 40, 41 have a vertical dimension which decreases smoothly from a maximum at wide ends 43 to a minimum at narrow ends 44.

Each electrode 38 has a top surface 42 normal to, and extending between, side surfaces 40, 41. The surface 42 is disposed at an angle to surface 39 due to the varying vertical dimension of side surfaces 40, 41. Cut out areas 46, 47 are formed at the narrow and wide ends 44, 43 respectively, leaving plugs 49. The plugs 49 extend through notches 35 and end walls 21, 28, 31. A voltage source 51 is connected by conductors 52 in parallel to every other electrode 38, and the remaining electrodes 38 are connected in parallel by conductors 53 to ground 54.

The narrow end cut outs 46 define a space 46a adjacent inlet end wall 28, and the wide end cut outs 47 define a space 47a adjacent outlet end wall 31. The baffle 36 is disposed within space 46a, extending between and beneath plugs 49, and against narrow ends 44. The notches 37 are positioned between adjacent ends 44 at the head of the channels 56 formed between the facing surfaces 41 of adjacent electrodes 38.

Each electrode 38 has a plurality of ribs 57 fixed to the channel-forming surface 41 and extending between bottom and top surfaces 39, 42. The ribs 57 are normal to surface 39 and are rectangular in cross section. The ribs 57 project into the channels 56, the ribs 57 of each surface 41 being so arranged as not to be directly across the channel 56 from the ribs 57 of the adjacent, facing surface 41. Each channel 56 thereby forms a serpentine path, as viewed in plan (FIG. 3), the general longitudinal axis of which is normal to the ends 21, 28, 31.

The electrodes 38 may be modified by having notches 58 (FIG. 4) cut into the bottom surfaces 39.

The electrodes also may be modified by having a plurality of plates 38', each with non-parallel bottom and top edges 39', 42' (FIG. 3) and with one side acting as channel-forming surface 41 bearing the ribs 57. The plates 38' at the ends thereof have areas 46', 47' and plugs 49' analogous to components 46, 47, 49. One plate 38' is substituted for a side electrode 38, and two plates 38' are paired in substitution for interior electrodes 38.

Figure 5:
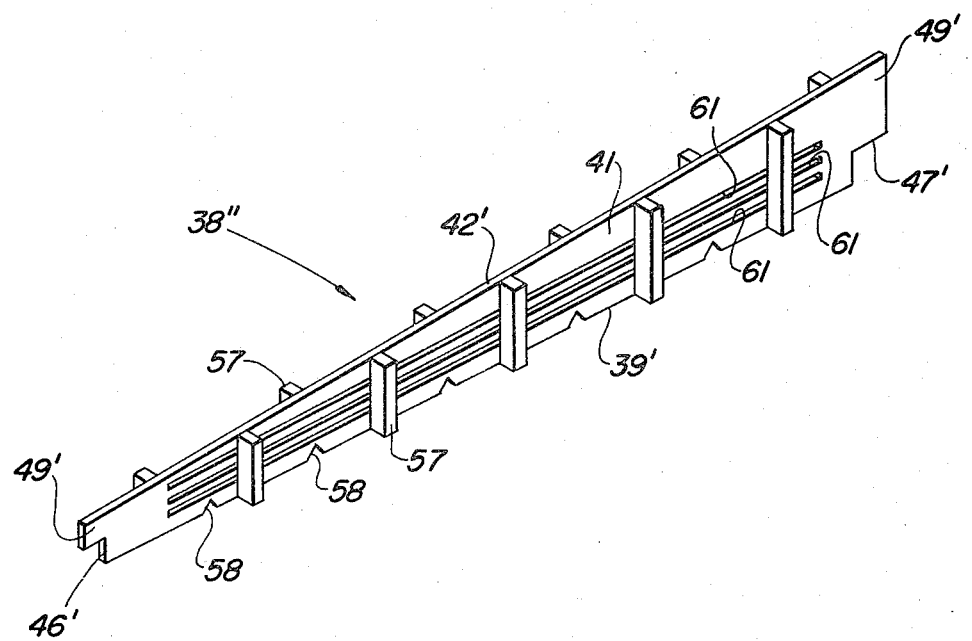
FIG. 5 is an enlarged, perspective view of an alternate form of electrode from the gas generation apparatus.
Figure 6:
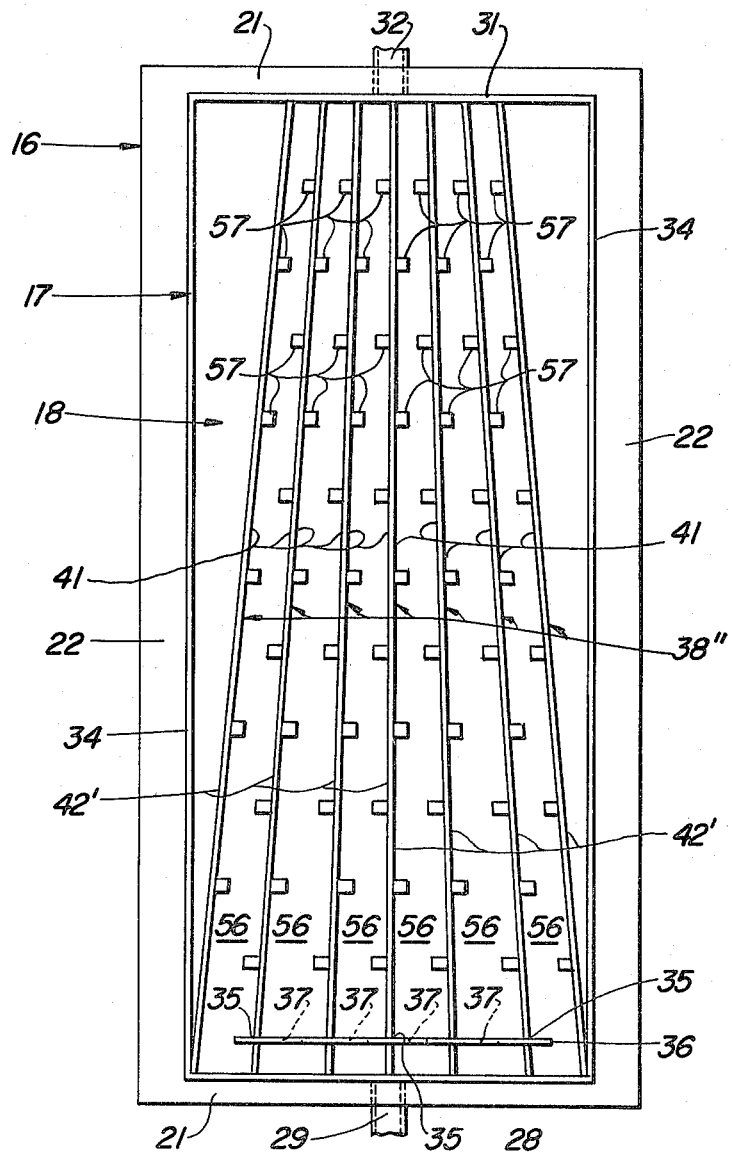
FIG. 6 is the same view as FIG. 3 but showing arrangement of the FIG. 5 electrodes.

The electrodes may be modified further by having a plurality of plates 38" as shown in FIG. 5. Each plate 38" again employs non-parallel bottom and top edges 39', 42'. Both sides act as channel-forming surfaces 41 bearing ribs 57. The plate 38" also has cut-out areas 46', 47' and plugs 49'. Additionally, the plate 38" has notches 58 formed several places along the length of edge 39'. A plurality of longitudinal slots 61 are formed through plates 38" and are parallel to edge 39'. As shown in FIG. 6, the plates 38" are deployed in a fan-like arrangement: side by side, with the cut-out areas 46' spaced relatively farther apart than the cut-out areas 47'. The general longitudinal axes of the channels 56 are converging as the channels 56 extend from end 28 to end 31.

When used, the gas generation apparatus 11 is disposed at an angle, preferably 10°–20°, from horizontal. The apparatus 11 is oriented such that the inlet end 28 is elevated above outlet end 31. Electrolyte enters the chamber 17 through inlet 29, enters space 46a and strikes the baffle 36, whereby the electrolyte is distributed transversely across the elevated end of bottom 27. The notches 58 of the modification aid in distributing the electrolyte as do the slots 61. Heated electrolyte is held at elevated temperatures due to the insulation function of chamber assembly 17.

The electrolyte flows, by gravity, from space 46a through notches 37, into the channels 56. The electrolyte is forced to flow in serpentine paths, the channels 56 gradually constricting, the electrolyte "piling up". A turbulent flow of electrolyte is achieved, thereby enhancing breaking down of the electrolyte, and facilitating freeing of oxygen-hydrogen gas bubbles toward the vents 26, the gas bubbles being wiped off the surfaces 41 and ribs 57 soon after they are formed. Turbulent flow is increased by the converging channels 56 of FIG. 6. The slots 61 increase the surfaces, and particularly the edges, where gas bubbles are formed and wiped off by electrolyte flow.

The surfaces 41 are separated a distance such that there is no arcing or sparking at the applied voltage. A channel 56 width varying from 1.27 cm to 2.54 cm ($\frac{1}{2}$ to 1 inch) has been found suitable for typical automobile voltage sources at 51.

The electrolyte can be preheated to 71° C. (160° F.) and above by various heat sources 12, thereby facilitating gas generation. The heat source(s) 12 in automobile applications may be jackets around the automobile engine cylinders, the automobile cooling system, or the automobile exhaust system for heat transfer. The oxygen-hydrogen gas generated may be employed as part of the fuel for the automobile.

Several units of the gas generation apparatus 11 can be employed at the same time in parallel fashion, preferably vertically arranged. All vents 26 would be coupled to a main collecting tube. Branch pipes would connect pipe 14b to the various inlets 29 and pipe 14c to the various outlets 32.

The industrial applicability of this invention of a gas generation apparatus is believed to be apparent. Although a preferred mode and modifications thereof have been disclosed herein, alternate constructions can be made without departing from the full scope of the invention defined in the claims.

I claim:

1. A gas generation apparatus for operating upon an electrolyte, said apparatus comprising:
   container means having inlet and outlet areas for receiving and discharging electrolyte respectively;
   gas removal means fixed to said container means; and
   electrode means, disposed in said container means, forming at least one channel for electrolyte flow between said inlet and outlet areas, said channel beginning adjacent said inlet area and continuously narrowing, deepening and descending therefrom toward said outlet area.

2. A gas generation apparatus for operating upon an electrolyte, said apparatus comprising:
   container means having inlet and outlet areas for receiving and discharging electrolyte respectively;
   gas removal means fixed to said container means;

electrode means, disposed in said container means, forming at least one channel for electrolyte flow between said inlet and outlet areas, said channel beginning adjacent said inlet area and continuously narrowing, deepening and descending therefrom toward said outlet area; and said electrode means forming a plurality of channels, the longitudinal axes of which converge as said channels extend from said inlet area toward said outlet area.

3. A gas generation apparatus for operating upon an electrolyte, said apparatus comprising:

container means having inlet and outlet areas for receiving and discharging electrolyte respectively;

gas removal means fixed to said container means;

electrode means, disposed in said container means, forming at least one channel for electrolyte flow between said inlet and outlet areas, said channel beginning adjacent said inlet area and continuously narrowing, deepening and descending therefrom toward said outlet area; and said electrode means including a plurality of electrodes, disposed side by side and extending from said inlet areas toward said outlet area, each having a pair of side surfaces diverging from each other, each side surface of one of said electrodes facing and converging toward a side surface of an adjacent electrode, said facing side surfaces forming said channel.

4. A gas generation apparatus for operating upon an electrolyte, said apparatus comprising:

container means having inlet and outlet areas for receiving and discharging electrolyte respectively;

gas removal means fixed to said container means;

electrode means, disposed in said container means, forming at least one channel for electrolyte flow between said inlet and outlet areas, said channel beginning adjacent said inlet area and continuously narrowing, deepening and descending therefrom toward said outlet area; and said electrode means including a plurality of electrode plate pairs disposed generally side by side and extending from said inlet area toward said outlet area, each pair having its electrode plates diverging from each other, each electrode plate of one of said pairs converging toward, and having a side surface facing, an electrode plate of an adjacent electrode plate pair, said facing side surfaces forming said channel.

5. A gas generation apparatus for operating upon an electrolyte, said apparatus comprising:

container means having inlet and outlet areas for receiving and discharging electrolyte respectively;

gas removal means fixed to said container means;

electrode means, disposed in said container means, forming at least one channel for electrolyte flow between said inlet and outlet areas, said channel beginning adjacent said inlet area and continuously narrowing, deepening and descending therefrom toward said outlet area; and said electrode means including a plurality of electrodes, disposed side by side and converging while extending from said inlet area toward said outlet area, each electrode having at least one side surface, a side surface of one electrode facing and converging toward a side surface of an adjacent electrode to form said channel.

6. The gas generation apparatus of claim 5 and further wherein each electrode includes longitudinal slot means.

7. The gas generation apparatus of claim 5 and further wherein each electrode includes bottom notch means.

8. The gas generation apparatus of claims 2, 3, 4 or 5 and further wherein said electrode means includes means for generating a serpentine electrolyte flow within said channel.

9. The gas generation apparatus of claim 8 and further wherein said means for generating a serpentine electrolyte flow within said channel includes a plurality of ribs fixed to said facing side surfaces and projecting therefrom into said channel.

10. The gas generation apparatus of claims 2, 3, 4 or 5 and further wherein said channel descends between said inlet and outlet at an angle of from 10°–20° to the horizontal.

* * * * *